(12) United States Patent
Miao

(10) Patent No.: US 11,947,055 B2
(45) Date of Patent: Apr. 2, 2024

(54) MULTILAYER REFLECTOR FOR HIGH EFFICIENCY AND HIGH SPATIAL RESOLUTION PIXELATED X-RAY SCINTILLATORS AND FABRICATION METHOD

(71) Applicant: Houxun Miao, Zionsville, IN (US)

(72) Inventor: Houxun Miao, Zionsville, IN (US)

( * ) Notice: Subject to any disclaimer, the term of this patent is extended or adjusted under 35 U.S.C. 154(b) by 0 days.

(21) Appl. No.: 17/744,841

(22) Filed: May 16, 2022

(65) Prior Publication Data
US 2023/0367023 A1 Nov. 16, 2023

(51) Int. Cl.
*G01T 1/20* (2006.01)
*G01T 1/24* (2006.01)

(52) U.S. Cl.
CPC ............ *G01T 1/2002* (2013.01); *G01T 1/242* (2013.01)

(58) Field of Classification Search
CPC .............................. G01T 1/2002; G01T 1/242
See application file for complete search history.

(56) References Cited

U.S. PATENT DOCUMENTS

| | | | |
|---|---|---|---|
| 2004/0114467 A1* | 6/2004 | Wiener-Avnear | H01L 27/14683 367/180 |
| 2005/0129171 A1* | 6/2005 | Jiang | G01T 1/2002 378/19 |
| 2015/0316659 A1* | 11/2015 | Okamura | H01L 27/14685 438/69 |
| 2015/0338529 A1* | 11/2015 | Svenonius | G01T 1/2002 264/135 |
| 2016/0178765 A1* | 6/2016 | Iltis | G01T 1/2985 250/362 |
| 2019/0219712 A1* | 7/2019 | Hagiwara | G01T 1/20 |
| 2023/0039378 A1* | 2/2023 | Datta | G01T 1/20 |

* cited by examiner

*Primary Examiner* — Hugh Maupin

(57) ABSTRACT

Disclosed herein is a pixelated x-ray scintillator with a multilayer reflector for x-ray detectors with simultaneous high spatial resolution and high quantum efficiency and fabrication method to produce the pixelated x-ray scintillator. The multilayer reflector provides high reflectivity for the emitted visible photons over a broad incident angle range, thus boosts the light output efficiency of the pixelated x-ray scintillator. The fabrication process to produce the pixelated scintillator with the multilayer reflector in this disclosure is compatible with standard semiconductor fabrication instrument and suitable for mass production.

13 Claims, 7 Drawing Sheets

MULTILAYER REFLECTOR FOR HIGH EFFICIENCY AND HIGH SPATIAL RESOLUTION PIXELATED X-RAY SCINTILLATORS AND FABRICATION METHOD

GOVERNMENT INTEREST STATEMENT

The present subject matter was made with U.S. government support. The U.S. government has certain rights in this subject matter.

CROSS REFERENCE TO RELATED APPLICATIONS

N/A

FIELD

The present invention relates to a pixelated x-ray scintillator for x-ray pixel detector with simultaneous high spatial resolution and high quantum efficiency. More specifically, the invention relates to a multilayer reflector to improve the light output efficiency of pixelated x-ray scintillators and fabrication method to integrate the reflector into the pixelated x-ray scintillator.

BACKGROUND

X-ray detectors with simultaneous high quantum efficiency and high spatial resolution will improve the performance of numerous x-ray imaging systems. However, such detectors are not currently available due to the intrinsic tradeoff between efficiency and spatial resolution in x-ray detectors. In scintillator based x-ray detectors, where each x-ray photon interacting with the scintillator material via photoelectric absorption is converted into a cluster of visible photons via a large number of secondary reactions, the efficiency and resolution trade-off arises from the isotropic emission of the secondary, visible photons.

Methods to produce structured scintillators to guide the secondary visible photons have been proposed and developed to improve the spatial resolution, including columnar growth of scintillating crystals [WO93/03496]; dicing or cutting of scintillator materials [U.S. Pat. No. 5,519,227]; filling a predefined pixelated (micro-well matrix) mold with scintillator powders via sedimentation [Yun, Seungman, et al. "Phosphor-filled micro-well arrays for digital x-ray imaging: effects of surface treatments." Medical Imaging 2010: Physics of Medical Imaging. Vol. 7622. International Society for Optics and Photonics, 2010.]; and filling a predefined pixelated mold via melting scintillator material into the Si micro-wells [U.S. Pat. No. 6,744,052 B1]. The dicing or cutting methods are restricted by the difficulty to form well-defined narrow walls, particularly when the structures are small (sub 100 µm), and the lengthy processing time. The spatial resolution of the columnar growth technique is limited by the cross talk between adjacent columns. Pixelated scintillators fabricated by filling Si micro-well matrix molds with CsI (Tl) crystal or $Gd_2O_2S$:Tb powder successfully confined the light within the micro-wells and led to a spatial resolution defined by the pixel pitch. However, the light output efficiency is so low that applications in low dose x-ray diagnosis are not appropriate. The reason is that the majority of the isotropically emitted secondary quanta experience many times of sidewall surface reflection before escaping the micro-wells.

Because of the spatial resolution limitation of the columnar growth technique and the extremely low light output efficiency of the techniques to fill pixelated Si molds with scintillator materials, there is a desire to develop a method to produce x-ray scintillators with simultaneous high resolution and high quantum efficiency. The fabrication technique should preferably be suitable for mass scale production and compatible with existing fabrication instrument.

SUMMARY

The objective of the present invention is to design a reflector with high reflectivity over a wide range of incident angle and suitable to be integrated into a pixelated mold (e.g. a Si micro-well matrix) to be filled with a scintillator material to produce a pixelated x-ray scintillator with simultaneous high spatial resolution and high quantum efficiency, and to develop a fabrication method to produce such pixelated x-ray scintillators.

The reflector consists of multiple layers of dielectric thin films with alternating high and low refractive indices at the emission wavelength of the x-ray scintillator material. The thicknesses of the dielectric layers are designed such that high reflectivity is achieved in a wide range of incident angle. To integrate the reflector into the pixelated mold (both the sidewalls and the bottom surfaces of the micro-wells), the dielectric layers of desired thicknesses can be accurately coated via conformal atomic layer deposition (ALD). When a Si micro-well matrix mold is used, the first dielectric layer adjacent to the Si micro-well surfaces can be $SiO_2$ and be accurately coated via wet or dry oxidation of Si to the desired thickness. The successive dielectric layers of desired thicknesses can then be accurately coated via conformal ALD. A thin layer of refractory metal can be conformally deposited via ALD on the micro-well surfaces before the multilayer reflector is coated to help further reduce the crosstalk between adjacent pixels and improve the reflectivity. The proposed reflector is compatible with the high temperature melting process (e.g. CsI (Tl) melting) to fill scintillator materials into the pixelated mold. The fabrication process is compatible with standard semiconductor fabrication instrument and suitable for mass production.

BRIEF DESCRIPTION OF THE DRAWINGS

The embodiments of the present invention will become better understood with reference to the following drawings. It is noted that, for purpose of illustrative clarity, certain elements in various drawings may not be drawn to scale. These drawings depict exemplary embodiments of the disclosure, but should not be considered to limit its scope. Preferred examples and embodiments are described hereinafter with reference to the accompanying drawings, wherein.

and the prior art SiO$_2$ reflector (refer to FIG. 2), assuming the micro-wells are filled with CsI crystal.

Figure 6:
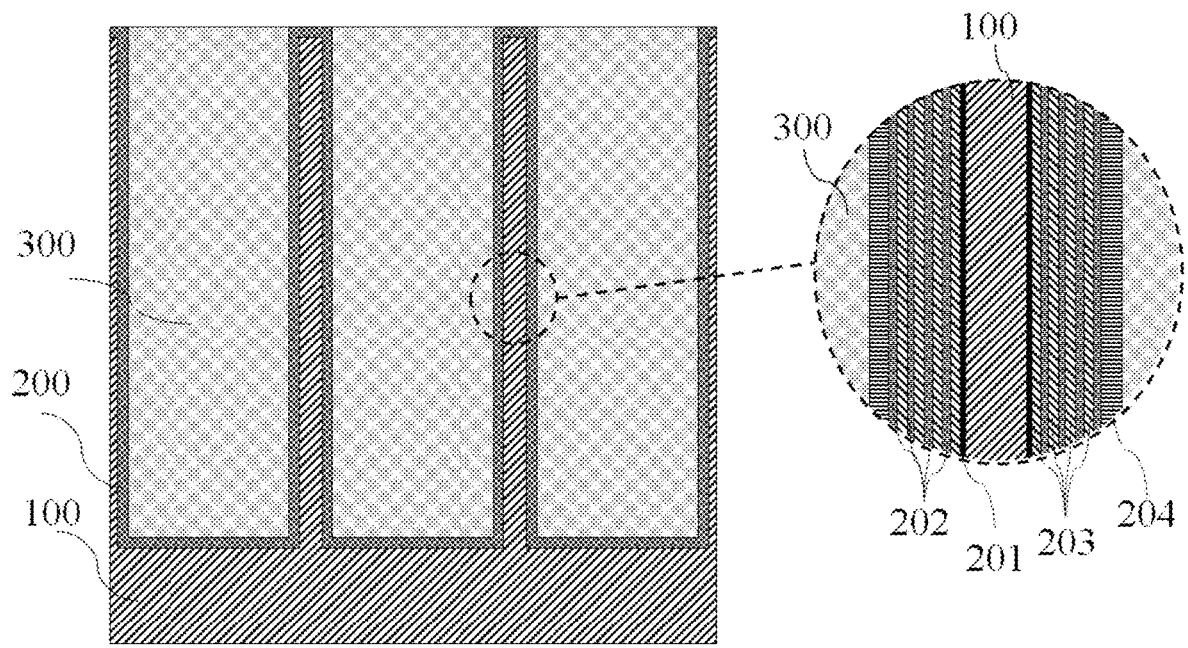

FIG. 6 is a schematic illustration of the cross-section view of a pixelated x-ray scintillator with a multilayer reflector, according to one embodiment of the present invention.

Figure 7:
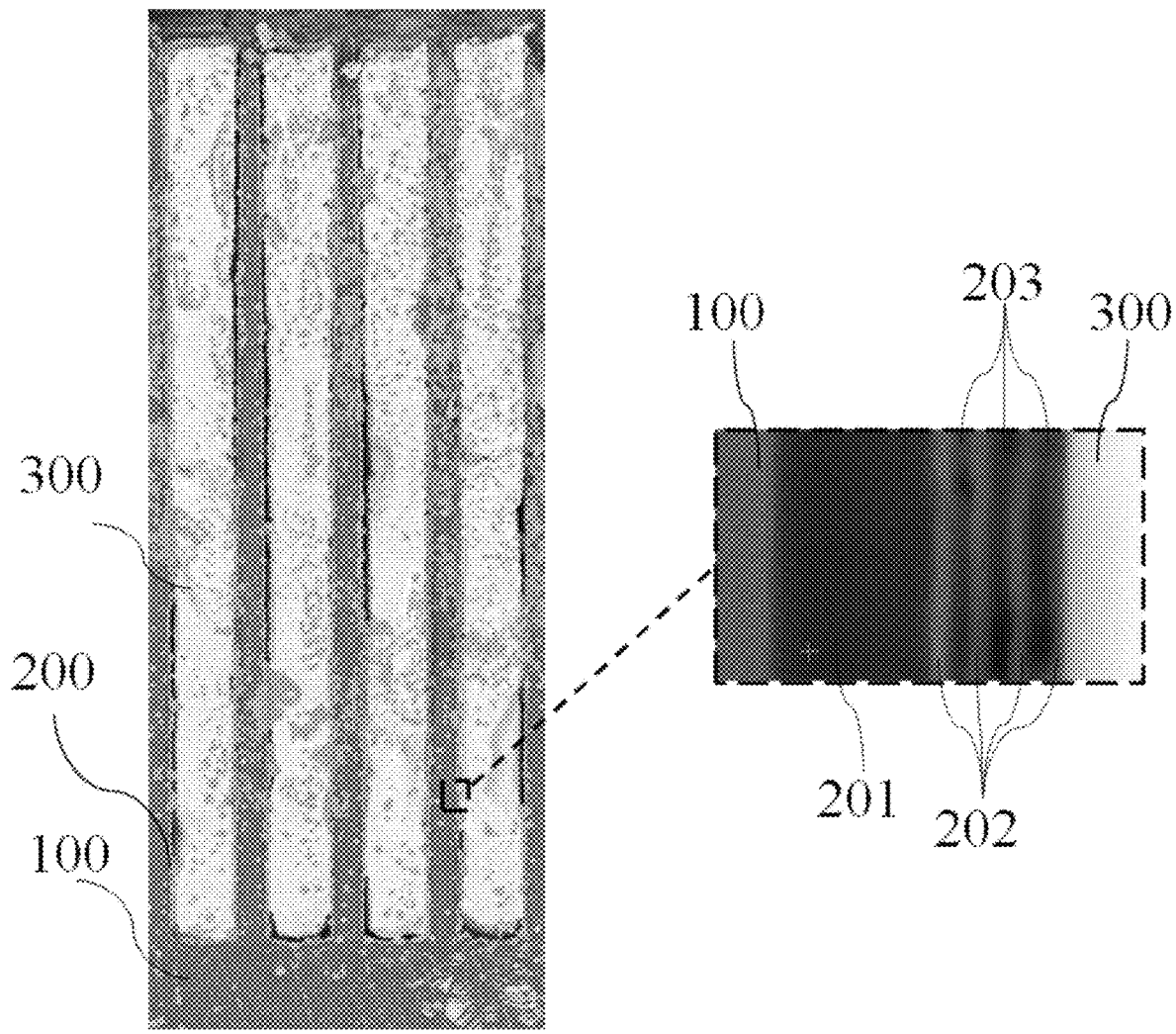

FIG. 7 is the cross-section SEM image of a fabricated pixelated x-ray scintillator with a multilayer reflector, according to one embodiment of the present invention.

DETAILED DESCRIPTION

Figure 1:
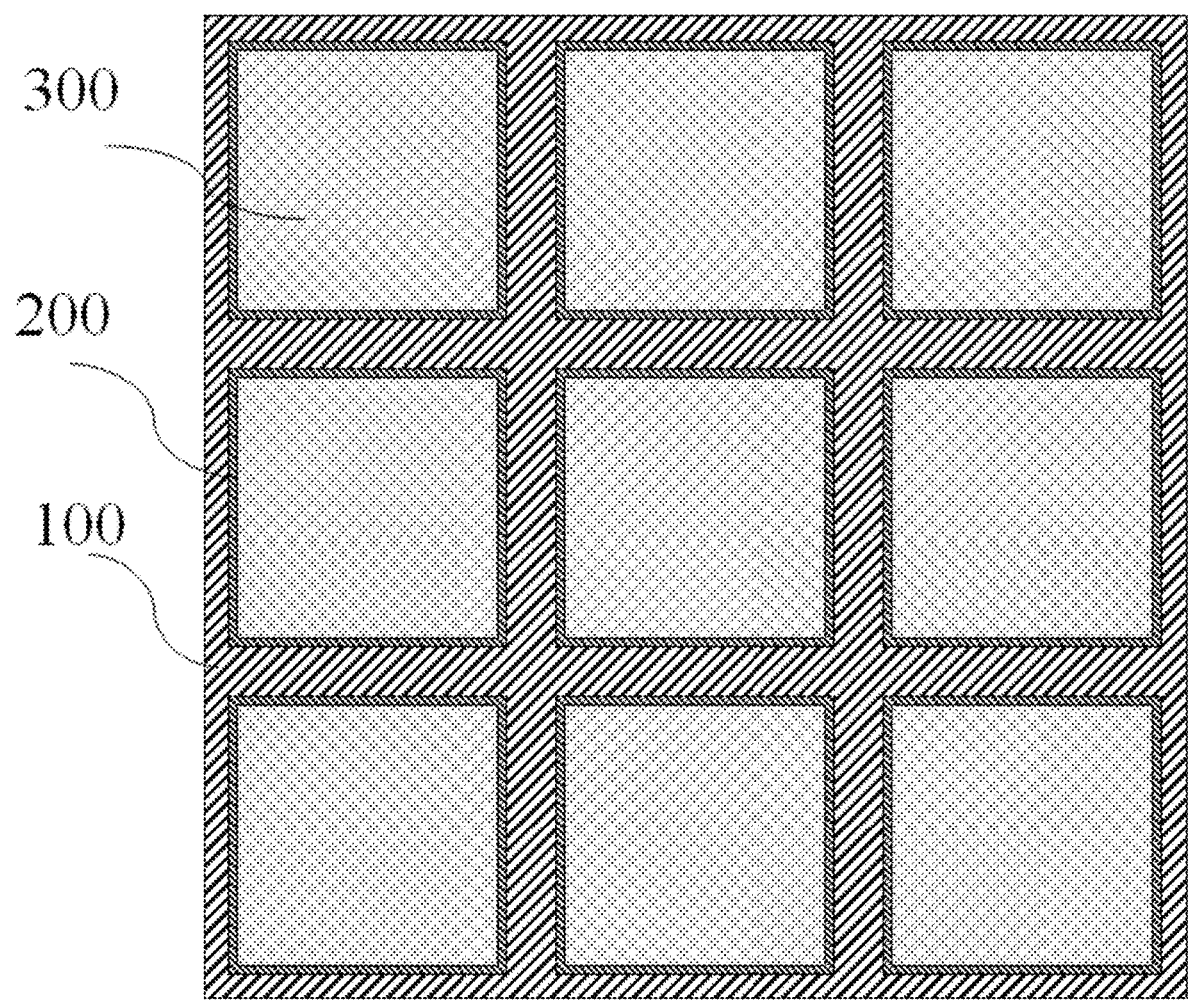
FIG. 1 is a schematic illustration of the top view of a prior art pixelated x-ray scintillator.

In the prior art research, pixelated scintillators (refer to FIGS. 1 to 3) fabricated by filling high aspect ratio Si micro-wells with CsI (Tl) or Gd$_2$O$_2$S:Tb successfully confined the light and led to a spatial resolution defined by the pixel pitch. The pixel can take a simple square shape as sketched in FIG. 1, or any other shapes (e.g. hexagon) that can improve the scintillator material filling factor. The performance of such a device critically depends on the reflectivity property of the sidewall and bottom surfaces of the micro-wells after scintillator material filling.

CsI (Tl) filled pixelated scintillators typically have higher quantum efficiency than Gd$_2$O$_2$S:Tb powder filled pixelated scintillators because of the low effective density and the grain boundary scattering of the light of the Gd$_2$O$_2$S:Tb powder.

Figure 2:
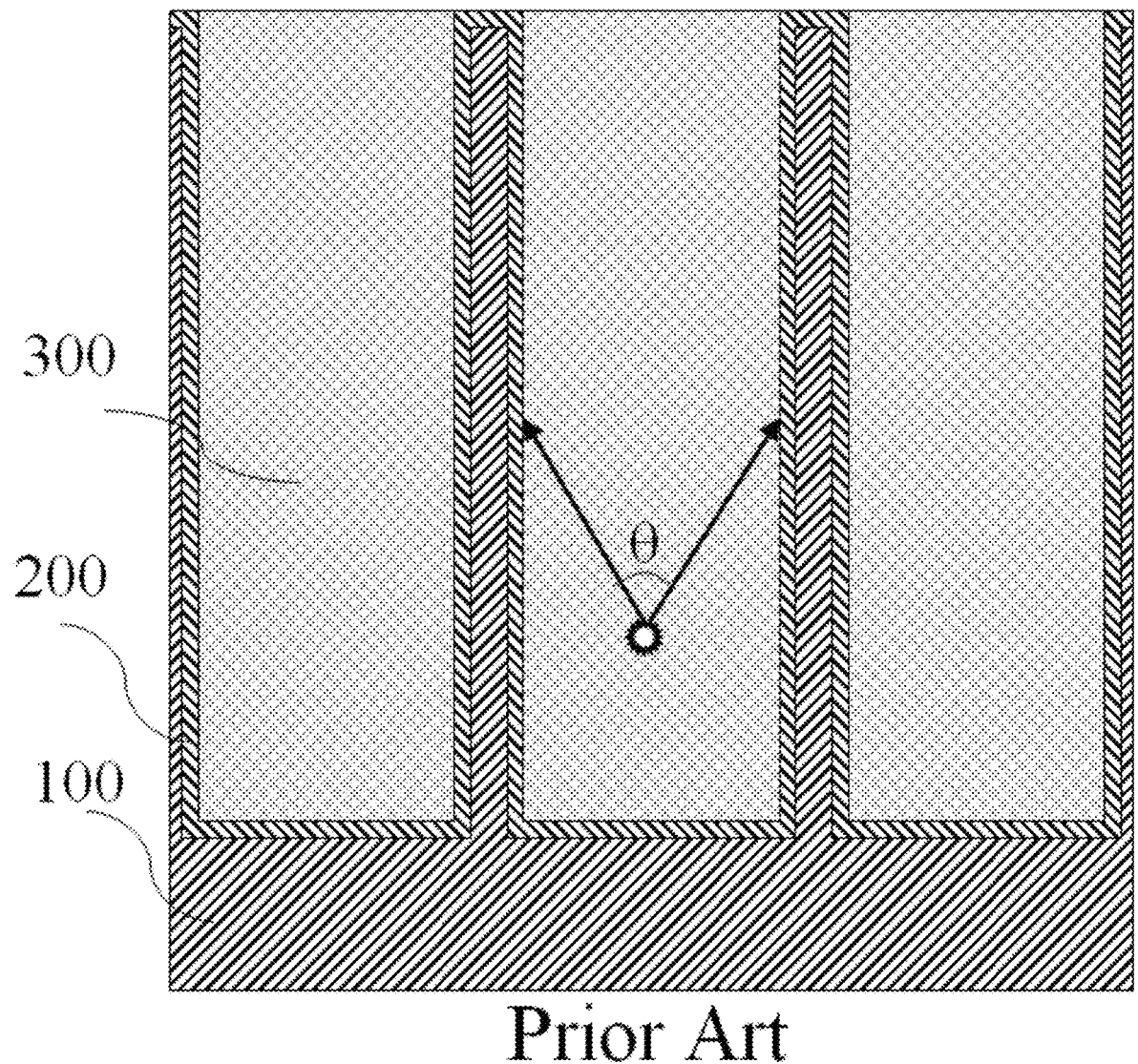
FIG. 2 is a schematic illustration of the cross-section view of a prior art pixelated x-ray scintillator with a $SiO_2$ reflector.
Figure 3:
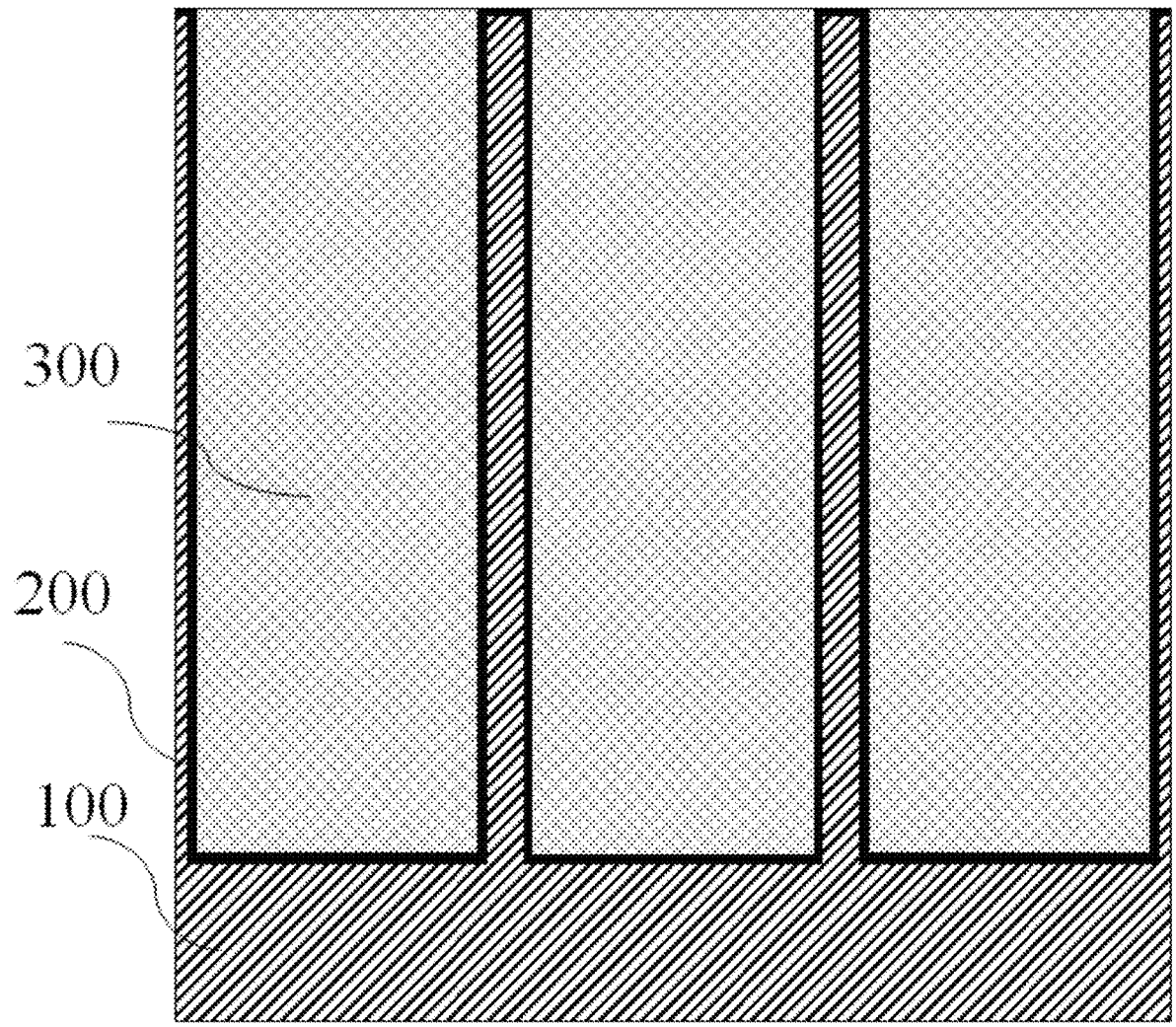
FIG. 3 is a schematic illustration of the cross-section view of a prior art pixelated x-ray scintillator with a metal reflector.

The reflectivity at the interface of a typical scintillator material and Si is usually very low at the emitted visible light wavelength. In prior art research, a layer of ~500 nm SiO$_2$ or a thin layer of Ru (both compatible with the high melting temperature of CsI at ≈621° C.) was used as the reflector to improve the reflectivity for CsI (Tl) filled pixelated scintillator. With the SiO$_2$ reflector (refer to FIG. 2) and CsI filling, total reflection occurs at an incident angle greater than the critical angle (approximately 57°), which significantly improves the reflectivity compared to a CsI and Si interface. The Ru reflector (refer to FIG. 3) improved the reflectivity to around 53% after CsI filling, which is less dependent on the incident angle. Since the aspect ratio (depth over the width of the micro-wells) of the Si micro-well matrix mold is high (typically between 5 to 15), the majority of the isotropically emitted visible light photons experience quite a few times of sidewall surface reflection before escaping the micro-wells. The light output efficiency of a device with the Ru reflector is very low. The device with the SiO$_2$ reflector has a better, but still low light output efficiency. Most of the photons emitted out of the small cone angle range of total reflection are not able to escape the well. As indicated in FIG. 2, the small cone angle range of total reflection is theoretically $\theta \approx 66°$ for ideal SiO$_2$ and CsI interface and is typically a few degrees smaller in practice.

The multilayer reflector in this disclosure takes advantage of the broad high reflectivity incident angle range of specially designed multilayer reflectors and ALD technique to conformally coat the side wall and bottom surfaces of the micro-wells of the mold with the desired layers of thin films to fabricate the reflector. When a pixelated Si mold is used, and the first layer adjacent to the sidewall and bottom surfaces of the Si micro-wells is designed to be SiO$_2$, wet or dry oxidation technique can be used to grow SiO$_2$ to the desired thickness to reduce the fabrication cost.

Various embodiments of the disclosure are discussed in details below. While specific implementations are discussed, it should be understood that this is done for illustration purposes only. A person skilled in the relevant art will recognize that other components and configurations may be used without parting from the spirit and scope of the disclosure. Thus, the following description, drawings and examples are illustrative and are not to be construed as limiting.

In one embodiment of the present invention (refer to FIG. 4), Si micro-well matrix 100 of 15 μm pitch and 150 μm depth is used as the mold and CsI (Tl) is used as the scintillator material 300. The Si wall thickness is preferably between 1 μm to 2 μm for a good filling factor, small crosstalk between pixels and mechanically robust structure during the filling process via melting. The multilayer reflector 200 consists of a layer of low refractive index thin film 201 (refractive index less than that of CsI at the emission wavelength) to produce total reflection for the photons emitted with incident angles above the critical angle and a number of layers of alternating high refractive index 202 and low refractive index 203 materials (Refer to FIG. 4). The arrangement (orders) of the total reflection layer and the multiple layers of high and low refractive index materials and their thickness can be designed in various ways, where total reflection should be achieved for large incident angles (determined by the refractive indices of CsI and the layer for total reflection), and high reflectivity should be achieved in a wide incident angle range. Since a thick reflector with more layers can improve the reflectivity, but reduce the CsI filling factor and increase the fabrication cost, a tradeoff between the total thickness of the reflector and the reflectivity performance should be made. Typical low refractive index materials for the total reflection layer 201 include (but not limited to) SiO$_2$, MgF$_2$, AlF$_3$, etc. Besides these low refractive index materials, materials with a slightly higher refractive index (e.g. Al$_2$O$_3$) can also be used as the low refractive index material 203. Typical high refractive index materials 202 include ZrO$_2$, TiO$_2$, etc. These materials can all be conformally deposited on the exposed surfaces (including both sidewall and bottom surfaces) of the high aspect ratio Si micro-wells via ALD and are compatible with the high temperature melting process during the CsI (Tl) filling.

Figure 4:
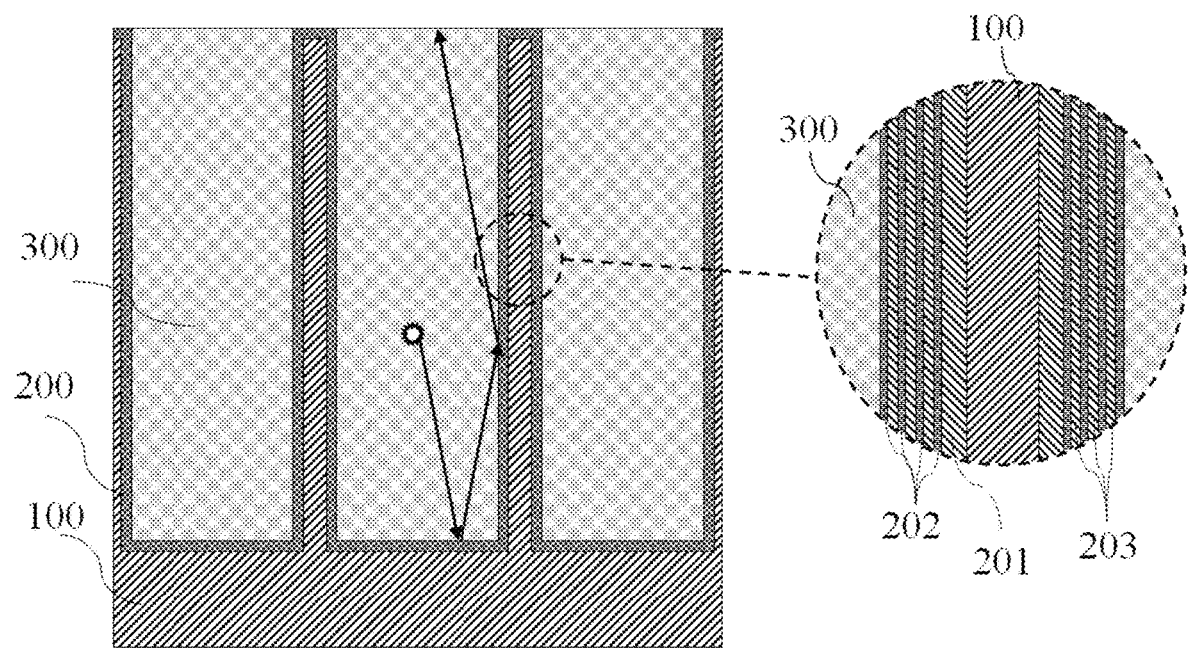
FIG. 4 is a schematic illustration of the cross-section view of a pixelated x-ray scintillator plate with a multilayer reflector, according to one embodiment of the present invention.
Figure 5:
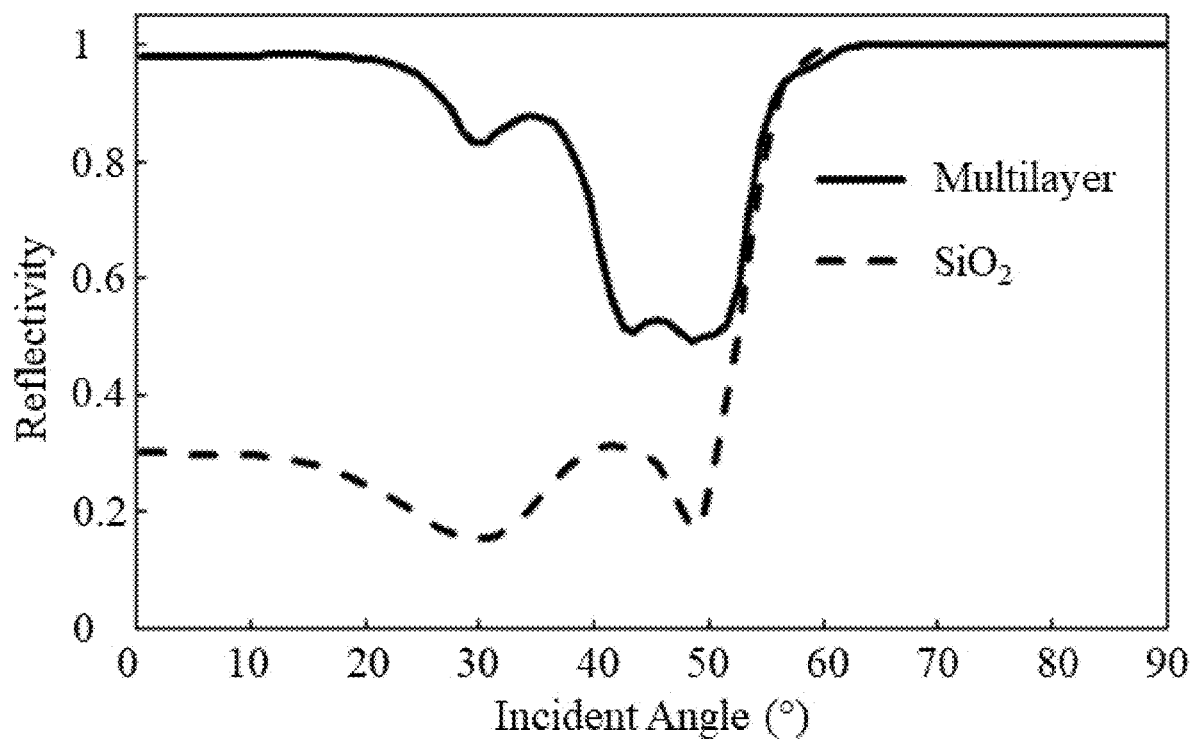
FIG. 5 is a comparison of the calculated reflectivity between the designed multilayer reflector (refer to FIG. 4)

As a design example, a reflector (refer to FIG. 4) can consist of a layer of SiO$_2$ grown on the surface of the Si micro-wells 100 via wet oxidation and a stack of TiO$_2$/SiO$_2$/TiO$_2$/SiO$_2$/TiO$_2$/SiO$_2$/TiO$_2$ layers deposited via ALD. Given the 550 nm center emission wavelength of CsI (Tl), the SiO$_2$ layer 201 is designed to have an optical path length of 687.5 nm. The layers of TiO$_2$ 202 and SiO$_2$ 203 are designed to have an optical path length of 151.25 nm each. With Si substrate and CsI (Tl) filling, the reflectivity of the designed multilayer reflector is calculated for incident angles from 0° to 90° (refer to FIG. 5). For comparison, the reflectivity of a 687.5 nm optical path length SiO$_2$ reflector is also plotted in FIG. 5. Compared to the SiO$_2$ reflector, the multilayer reflector in the present invention maintains the total reflection at large incident angles and significantly improves the reflectivity at incident angles smaller than the critical angle. The high reflectivity over a broader incident angle range on the sidewall and bottom surface of the micro-wells contributes to a much-improved light output efficiency. In particular, the high reflectivity at the bottom surface significantly improves the escaping rates of the photons emitted towards the bottom surface (which accounts for a half of total emitted photons) as indicated in FIG. 4.

In one embodiment of the present invention (Refer to FIG. 6), Si micro-well matrix 100 of 50 μm pitch and 400 μm depth is used as the mold and CsI (Tl) is used as the filling scintillator material 300. The multilayer reflector 200 consists of a thin layer of metal (e.g. Ru, W) 201 compatible with the high temperature CsI melting process and conformal ALD deposition, a low refractive index thin film 204 (refractive index less than that of CsI at emission wavelength) to produce total reflection for the photons emitted at the incident angle larger than the critical angle and a stack of 8 layers of high reflective 202 and low reflective index 203 materials (Refer to FIG. 6). The metal layer 201 is coated on the Si micro-well surfaces to allow thinner Si wall to improve the filling factor by eliminating the potential crosstalk between adjacent pixels with thin Si wall. A very thin layer (e.g. 2 nm) of $Al_2O_3$ can be conformally ALD coated on the Si walls as nucleation layer to facilitate the metal ALD deposition process. The orders of the total reflection layer 204 and the multiple layers of high 202 and low 203 refractive index materials and their thicknesses can be designed in various ways, where total reflection should be achieved for incident angles above the critical angle, and high reflectivity should be achieved in a wide incident angle range. As a design example, the reflector (Refer to FIG. 6) consists of a layer of Ru conformally coated on the Si micro-well 100 surface using 2 nm $Al_2O_3$ as nucleation layer, a stack of $TiO_2/Al_2O_3/TiO_2/Al_2O_3/TiO_2/Al_2O_3/TiO_2$ layers and a layer of $MgF_2$. The Ru layer 201 is designed to have a thickness of 100 nm. The layers of $TiO_2$ 202 and $SiO_2$ 203 are designed to have an optical path length of 151.25 nm. The $MgF_2$ layer 204 is designed to have an optical path length of 687.5 nm.

The fabrication process of the pixelated scintillator with the multilayer reflector in this disclosure is compatible with standard semiconductor fabrication process and suitable for mass production. The fabrication process involves creating of a micro-well matrix mold, coating the surface (including the sidewall and bottom) of the micro-wells with the designed multilayer reflector and then fill the micro-wells with scintillator material. A Si micro-well matrix can be conveniently fabricated via deep reactive ion etching (DRIE) using a Bosch process, cryogenic deep Si etching, KOH etching, metal assisted chemical etching (MACE) of Si and photoelectrochemical etching of Si. When a layer of $SiO_2$ is designed to be next to the Si surface of the micro-wells, it can be grown conformally via wet or dry oxidation. All the other layers of materials can be conformally deposited via ALD. When CsI (Tl) is used as the scintillator material, it can be filled into the micro-wells via a melting process.

In one embodiment of the fabrication process, a Si micro-well matrix 100 (refer to FIG. 7) of 15 μm pitch, 142 depth was fabricated via DRIE. The width of the Si wall is controlled to be approximately 2 μm. A layer of 471 nm of $SiO_2$ 201 was conformally grown via wet oxidation. After that, a stack of $TiO_2/Al_2O_3/TiO_2/Al_2O_3/TiO_2/Al_2O_3/TiO_2$ layers was conformally coated via ALD. The thickness of each $TiO_2$ layer 202 is ≈61 nm, and was coated using Tetrakis(dimethylamino)titanium(IV) (TDMAT) and $H_2O$ precursor. The thickness of each $Al_2O_3$ layer 203 is ≈94 nm and was coated using Trimethylaluminum (TMA) and $H_2O$ precursor. Finally, CsI (Tl) 300 was filled into the micro-wells via melting CsI (Tl) powders placed on the surface of the Si micro-well matrix at 626° C. for 6 minutes. FIG. 7 shows the cross section SEM images of a fabricated device. The zoom-in view shows the details of the multilayer reflector.

What is claimed is:

1. A pixelated x-ray scintillator for high spatial resolution and high quantum efficiency x-ray detector, comprising:
    a) A micro-well matrix presenting a pitch corresponding to the spatial resolution of the scintillator and thin micro-well walls for high filling factor;
    b) An integrated reflector consisting of a total reflection reflector to reflect light with incident angle larger than the critical angle and an alternatively high and low refractive index multilayer reflector to reflect light with incident angle smaller than the critical angle, coated on all the exposed surfaces (including the sidewall and bottom surfaces) of the micro-well matrix to produce high reflectivity over a wide incident angle range;
    c) A scintillator material filled into the micro-well matrix.

2. The pixelated x-ray scintillator plate according to claim 1, wherein the multilayer reflector consists of
    a) A dielectric layer with a refractive index smaller than the refractive index of the scintillator material to be filled in the micro-well matrix to produce total reflection for the emitted visible photons with an incident angle greater than the critical angle;
    b) A stack of alternating high refractive index and low refractive index dielectric materials to produce high reflectivity [over a wide incident angle range] for photons with incident angle smaller than the critical angle in 3a.

3. The reflector according to claim 2, wherein the thickness of the dielectric layer to produce total reflection is preferably with an optical path length 0.75 to 1.25 times the emitted photon wavelength (wavelength in vacuum), to produce sufficient total reflection and not to significantly reduce the filling factor.

4. The total reflection layer according to claim 2, wherein the dielectric material includes (but not limited to) $SiO_2$, $MgF_2$ and $AlF_3$.

5. The reflector according to claim 2, wherein the high refractive and low refractive index materials in the multilayer stack are selected to have a large enough refractive index difference to produce high reflectivity [over a wide] incident angle smaller than the critical angle with preferably less than 10 layers of material in total to keep the filling factor high and the fabrication cost low.

6. The multilayer stack according to claim 5, wherein the high refractive index dielectric material includes (but not limited to) $TiO_2$ and $ZrO_2$.

7. The multilayer stack according to claim 5, wherein the low refractive index dielectric material includes (but not limited to) $Al_2O_3$, $SiO_2$, $MgF_2$ and $AlF_3$.

8. The reflector according to claim 2, wherein the thicknesses of the high refractive and low refractive index materials are designed with respect to the thickness of the total reflection layer to produce high reflectivity over a broad incident angle range.

9. The reflector according to claim 2, wherein the total reflection layer can be placed between the multilayer stack and the Si surface, or between the multilayer stack and the scintillator material, or between any two layers of the multilayer stack, or embedded in one of the low refractive index layers in the multilayer stack if a same material is selected.

10. The multilayer reflector according to claim 2, wherein a thin layer of metal is conformally deposited on the micro-well matrix surface (including the sidewall and bottom surface) before the multilayer reflector is coated to help further reduce the crosstalk between adjacent pixels and improve the reflectivity.

11. The thin metal layer according to claim 10, wherein the metal material includes (but not limited to) Ru, W.

12. A method of fabricating a pixelated x-ray scintillator plate for high spatial resolution and high quantum efficiency x-ray detector, comprising:

a) Fabricate a Si micro-well matrix with desired pitch, depth and wall width;
b) Conformally coat multiple layers of materials to form a reflector only consists of dielectric layers and the first layer immediately to the micro-well matrix's Si surface is $SiO_2$; The first $SiO_2$ layer is conformally coated via wet or dry oxidation, or ALD; The successive layers are coated via ALD;
c) Fill multilayer reflector coated micro-well matrix with the scintillator material.

13. A method of fabricating a pixelated x-ray scintillator plate for high spatial resolution and high quantum efficiency x-ray detector, comprising:
a) Fabricate a Si micro-well matrix with desired pitch, depth and wall width;
b) Conformally coat multiple layers of materials to form a reflector with a thin metal layer (e.g. 100 nm Ru or W) to prevent cross talk between adjacent pixels; The thin metal layer is first conformally deposited via ALD, with a very thin (e.g. 2 nm) nucleation layer (e.g. $Al_2O_3$) pre-deposited via ALD if necessary; Then multiple dielectric layers are deposited via ALD to form the reflector,
c) Fill multilayer reflector coated micro-well matrix with the scintillator material.

* * * * *